(12) United States Patent
Orlamünder et al.

(10) Patent No.: US 6,352,147 B1
(45) Date of Patent: Mar. 5, 2002

(54) INTERMEDIATE DISK FOR A MOTOR VEHICLE

(75) Inventors: Andreas Orlamünder; Achim Link, both of Schweinfurt (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/465,063

(22) Filed: Dec. 16, 1999

(30) Foreign Application Priority Data

Dec. 17, 1998 (DE) .......................................... 198 58 260

(51) Int. Cl.⁷ ................................................ F16D 13/72
(52) U.S. Cl. ................................ 192/107 R; 192/70.12; 192/113.26
(58) Field of Search ........................... 192/70.12, 107 R, 192/113.2, 113.21, 113.26; 188/71.6, 218 XL, 264 A, 264 AA

(56) References Cited

U.S. PATENT DOCUMENTS

| 1,453,599 A | | 5/1923 | Parker |
| 2,197,232 A | * | 4/1940 | Wood ..................... 192/113.26 |
| 2,674,356 A | | 4/1954 | Eason ......................... 192/18 |
| 2,675,106 A | | 4/1954 | Foster ........................ 192/113 |
| 3,486,218 A | * | 12/1969 | Buyze ................ 192/107 R X |
| 3,730,304 A | * | 5/1973 | Buyze .................... 188/218 X |
| 3,805,935 A | * | 4/1974 | Armstrong ............. 192/113.26 |
| 4,576,266 A | | 3/1986 | Schilling et al. ......... 192/70.12 |
| 5,678,675 A | * | 10/1997 | Dover et al. ............ 192/107 R |

FOREIGN PATENT DOCUMENTS

| DE | 703 083 | 2/1941 |
| DE | 37 12 715 | 11/1995 |

* cited by examiner

*Primary Examiner*—Richard M. Lorence
(74) *Attorney, Agent, or Firm*—Cohen, Pontani, Lieberman & Pavane

(57) ABSTRACT

An intermediate disk for a motor vehicle clutch with friction surfaces on both sides includes two disk parts. On the sides of the disk parts remote of the friction surfaces, the disk parts have spacers which laterally define recesses between the disk parts. This arrangement of the intermediate disk provides a large heat-releasing surface even when the intermediate disk has small dimensions.

7 Claims, 3 Drawing Sheets

INTERMEDIATE DISK FOR A MOTOR VEHICLE

BACKGROUND OF THE INVENTION

1. Field of the Invention

The present invention relates to an intermediate disk for a motor vehicle clutch having friction surfaces on both sides and fastened for rotation with a first shaft, said intermediate disk being arranged between friction facings which are fastened for rotation with a second shaft for generating a frictional engagement between the friction facings and the friction surfaces, and the intermediate disk having recesses in a central area between the friction surfaces.

2. Description of the Related Art

Intermediate disks are used in modern multidisk clutches and are known from practice. The prior art intermediate disk is manufactured, for instance, as a cast part and recesses between the friction surfaces are formed by cores which are to be inserted in the casting mold and guided from the edge of the intermediate disk toward its center. When the clutch is operated, and especially during an engagement process, frictional heat is generated at the friction surfaces when the friction facings move against the friction surfaces. This frictional heat produces a very intensive heating of the intermediate disk, so that a reliable frictional engagement of the clutch is no longer guaranteed. Therefore, the recesses are provided to increase the heat-releasing surface of the intermediate disk. Additionally, the recesses reduce the weight of the intermediate disk and therefore, reduce the mass inertia.

However, for technical reasons related to casting, it is usually not possible, particularly in small clutches such as those for passenger vehicles, to employ casting to provide the recesses in the intermediate disks which are generally very thin. It is for this reason that solid intermediate disks are usually used in clutches with small dimensions.

The recesses could be incorporated in the intermediate disk after casting by machining steps such, for example, as cutting and/or drilling. However, this type of construction of the intermediate disk is very cost-intensive.

SUMMARY OF THE INVENTION

The object of the invention is to construct an intermediate disk having recesses between the frictional surfaces such that the intermediate disk is produced economically and such that the intermediate disk can carry off heat successfully while retaining small dimensions typically used in passenger cars.

This problem is solved according to the invention in that the intermediate disk has first and second disk parts that are connected with one another. The first and second disk parts each have one of the friction surfaces and each of the first and second disk parts adjoins recesses arranged through the intermediate disk between the friction surfaces. Furthermore, spacers are arranged between the disk parts.

As a result of this construction, the recesses are freely accessible from the sides of each disk part remote from the friction surfaces, so that they can easily be incorporated in the disk parts or provided during casting. Since the intermediate disk does not require any machining proceeding from its edge to produce the recesses, it is very simple and economical to produce. In addition, the disk parts require only the thickness necessary for a given stability of the intermediate disk. The quantity and dimensions of the spacers are arrangeable so that the intermediate disk is constructed with high stability. Accordingly, small and thin intermediate disks for multiple disk clutches used in passenger vehicles are provided with recesses according to the invention to increase their heat-releasing surface.

The intermediate disk according to an embodiment of the present invention comprises a particularly small number of structural component parts to be assembled when the spacers are manufactured as an integral part with at least one of the first and second disk parts. In the simplest embodiment, the first and second disk parts may be produced together with the spacers by casting in a coreless mold with axial casting ejection.

The intermediate disk according to the invention may be made particularly economically when the spacers are arranged on the side of each of the first and second disk parts remote from the friction surface. According to this embodiment, the first and second disk parts may be identically constructed.

Especially large recesses may be arranged in very thin intermediate disks when the disk parts contact each other exclusively at the spacers. According to this embodiment, each of the first and second disk parts requires depressions that correspond to half of the depth of the recesses. Further, this construction allows the disk parts to be machined by cutting in a simple manner to a given extent after casting. The first and second disk parts according to the this embodiment contact one another so that they adjoin at the machined locations.

The connection of the first and second disk parts may comprise a weld. However, heat warping caused by welding may be prevented by riveting the first and second disk parts to one another.

The intermediate disk according to the present invention may be assembled simply when the first and second disk parts are pretensioned relative to one another by clamps. Furthermore, a plurality of clamps may be connected via crosspieces or webs to form a clamping ring, for example, to reduce the quantity of structural component parts.

A given thickness of the intermediate disk according to the present invention may be adjusted when the spacers are constructed as a plurality of distance pieces arranged between the first and second disk parts. The distance pieces may have dimensions corresponding to the given thickness of the intermediate disk and may be exchanged to produce different thicknesses of the intermediate disks in building-block or modular form. The first and second disk parts may be inexpensively stamped from sheet metal in this construction.

The assembly of the intermediate disk according to the present invention may be especially economical when the spacers are constructed as distance pieces with integral rivets penetrating the first and second disk parts.

Assembly costs for the intermediate disk according to the present invention are further reduced when the spacers are constructed as web pieces of a corrugated ring arranged between the two disk parts.

According to another advantageous further development of the invention, the corrugated ring forms a positive radial engagement with the first and second disk parts when the corrugated ring has bars or clips penetrating into recesses of the first and second disk parts. This embodiment relieves the fastening elements required for connecting the disk parts.

According to another embodiment of the present invention, the corrugated ring is manufactured with fastening elements connecting the disk parts with one another when the clips of the corrugated ring are beaded or flanged so as to engage behind the disk parts. As a consequence of this construction, the assembly of the first and second disk parts may be automated.

According to another embodiment of the present invention, the carrying off of heat through the recesses is improved in that the spacers are constructed as air-conducting elements for guiding the air present between the disk parts.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figures 1, 2:
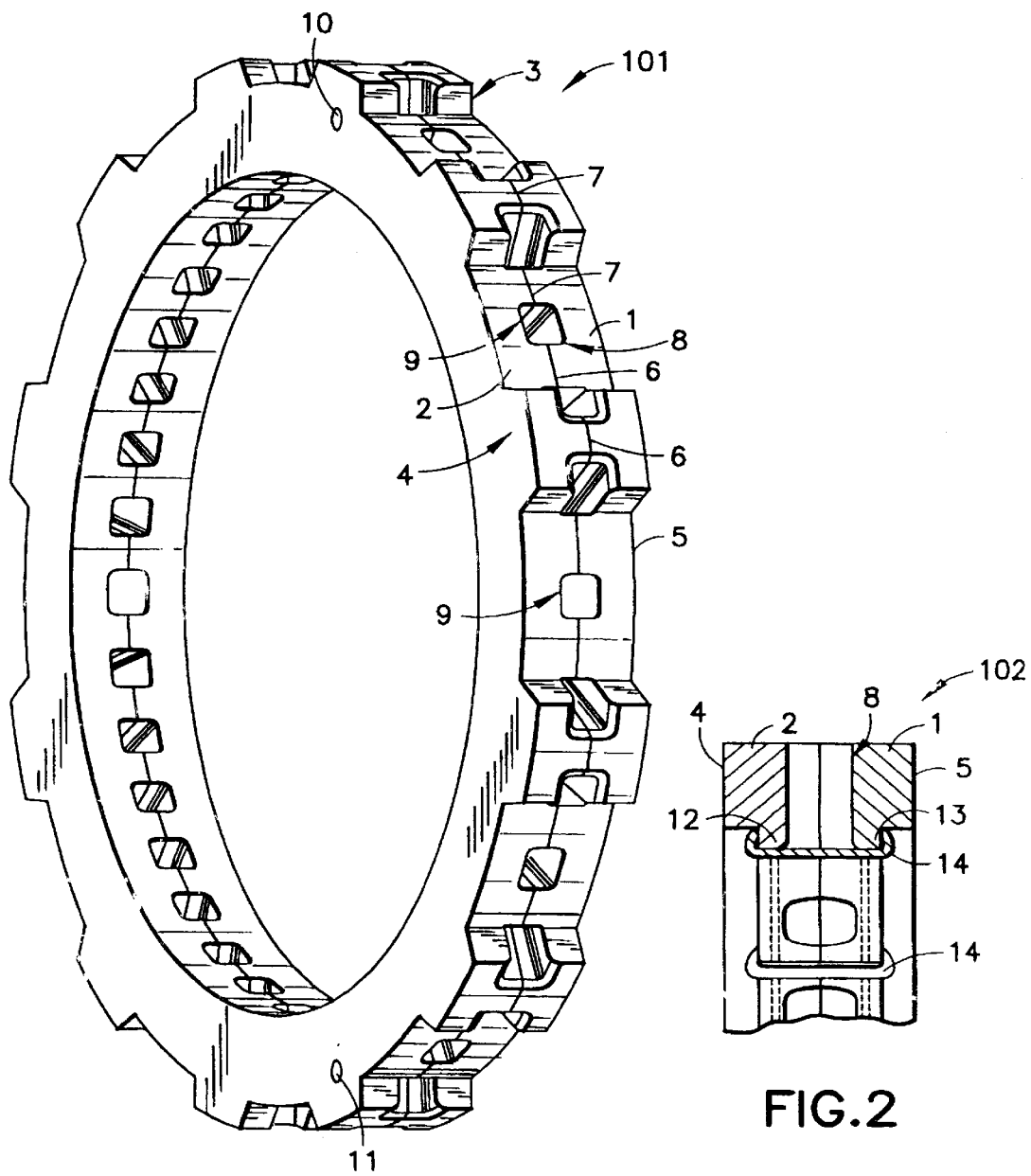
FIG. 1 is a perspective view of an intermediate disk according to an embodiment of the present invention.
FIG. 2 is a longitudinal section showing an upper portion of an intermediate disk according to another embodiment of the present invention.

FIG. 1 shows an intermediate disk 101 according to the present invention with first and second disk parts 1, 2 (collectively referred to as disk parts 1, 2). The intermediate disk 101 has a toothing 3 facing radially outward. The intermediate disk 101 may be connected with a first shaft of the clutch (not shown) via the toothing 3 so that the intermediate disk 101 is fixed with respect to rotation and axially displaceable relative to the first shaft such, for example, as via an input part (not shown). The disk parts 1, 2 have respective first and second friction surfaces 4, 5. The first disk part 1 includes first spacers 6 which project toward the second disk part 2 and the second disk part 2 has second spacers 7 which project toward the first disk part 1. The disk parts 1,2 contact one another via the first and second spacers 6, 7. The disk parts 1, 2 are manufactured integral with the first and second spacers 6, 7. The first and second spacers 6, 7 respectively form recesses 8, 9 which are guided in the manner of ducts or channels from a radial inner boundary to a radial outer boundary of the intermediate disk 101. The first and second spacers 6, 7 are constructed as air-conducting elements for guiding the air which is present between the disk parts 1, 2 through the recesses 8, 9. The first and second recesses 8, 9 which are arranged in the form of channels may also follow a tangential configuration for guiding the air from the radial inner boundary to the radial outer boundary of the intermediate disk 101. The disk parts 1, 2 are connected with one another by rivets 10, 11.

For purposes of manufacture, the first and second disk parts 1, 2 may be prefabricated, for example, in a casting mold from which they can be removed axially. Subsequently, both sides of the disk parts 1, 2 may be finish-turned and/or polished to a given extent. Instead of being cast in a casting mold, the disk parts 1, 2 may alternatively be stamped from sheet metal. Subsequent to the stamping, the depressions for the recesses 8, 9 may be cut into the disk parts 1, 2.

FIG. 2 shows another embodiment form of an intermediate disk 102 according to the present invention in which the disk parts 1, 2 respectively include first and second circumferential rims 12, 13 on a radial inner side of the intermediate disk 102 at an axial distance from the first and second friction surfaces 4, 5. In this embodiment, clamps 14 are arranged on the first and second circumferential rims 12, 13 for pretensioning the disk parts 1, 2 relative to one another. Two clamps 14 are shown in the drawings and any number may be arranged about the circumference of the intermediate disk 102 for holding the disk parts 1, 2. The clamps 14 are shown individually in the drawing. However, the clamps 14, 15 may also be connected with one another by a clamping ring to facilitate assembly of the intermediate disk 102.

Figure 3:
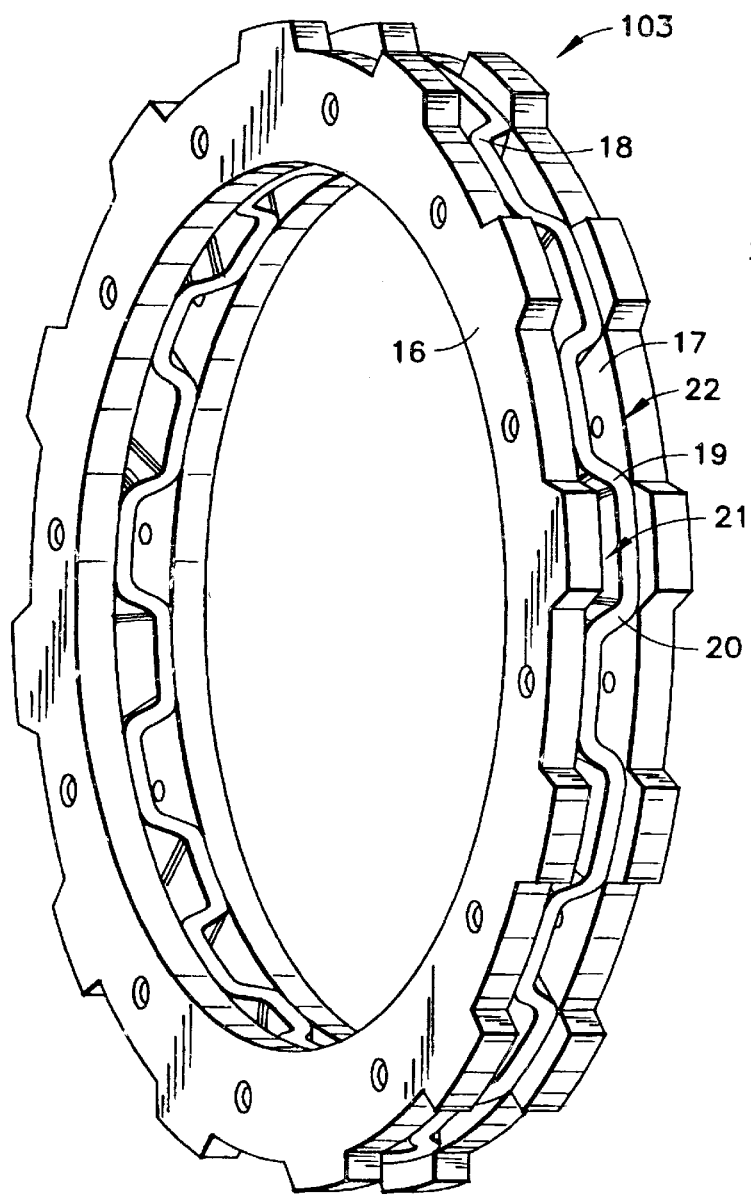
FIG. 3 is a perspective view showing another embodiment of an intermediate disk according to the present invention with a corrugated ring.

FIG. 3 shows a perspective view of another embodiment form of an intermediate disk 103 according to the present invention. The intermediate disk 103 has first and second disk parts 16, 17 which are flat and a corrugated ring 18 with spacers 19, 20 arranged between the first and second disk parts 16, 17. The spacers 19, 20 comprise webs of the corrugated ring 18. When the intermediate disk 103 is assembled, recesses 21, 22 are formed which are defined, respectively, by one of the first and second disk parts 16, 17, the corrugated ring 18, and two adjacent spaces 19, 20. The assembled corrugated ring 18 and disk parts 16, 17 are riveted together at their adjoining areas. In this embodiment, the disk parts 16, 17 may, for example, be stamped from flat sheet metal parts.

Figure 4:
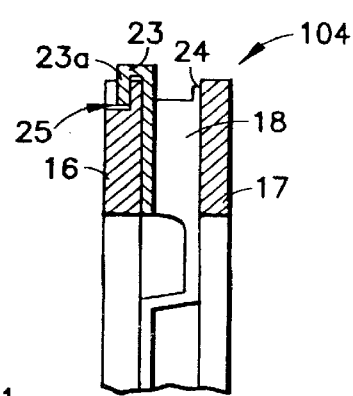
FIG. 4 is a longitudinal section showing an upper portion of an intermediate disk according to another embodiment of the present invention.

FIG. 4 shows another embodiment form of an intermediate disk 104 according to the invention. The intermediate disk 104 differs from the intermediate disk 103 shown in FIG. 3 in that the corrugated ring 18 comprises clips 23, 24. The clips 23, 24 are beaded or flanged in corresponding recesses 25 of the disk parts 16, 17. The clip 23 corresponds to the first disk part 16 and the clip 24 corresponds to the second disk part 17. In the preferred embodiment, the clips 23, 24 are formed as an integral part of the corrugated ring 18. The insertion and engagement of the clips 23, 24 in the recesses 25 of the disk parts 16, 17 creates a radial engagement between the disk parts 16, 17. A flanged portion 23a creates a positive engagement for pretensioning the first part 16 and the second disk part 17.

Figure 5:
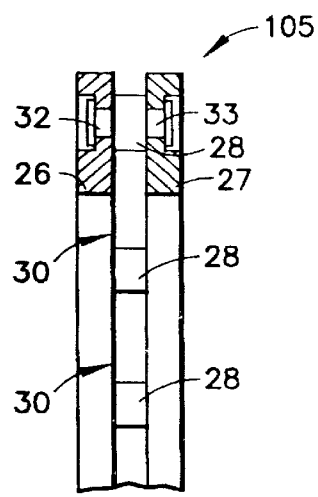
FIG. 5 is a longitudinal section showing an upper portion of another embodiment of an intermediate disk according to the present invention with distance pieces.

FIG. 5 shows another embodiment form of an intermediate disk 105 according to the present invention in which first and second disk parts 26, 27 which are formed as flat disks are held apart at a distance from one another by spacers 28 constructed as cylindrical distance pieces. This arrangement of the intermediate disk 105 has recesses 30 arranged between the first and second disk parts 26, 27 and between adjacent ones of the spacers 28. The spacers 28 are manufactured as one piece with rivets 32, 33 on opposing ends of the cylindrical distance piece section. The rivets 32, 33 penetrate apertures in the first and second disk parts 26, 27 and pretension the disk parts 26, 27 relative to one another.

Figure 6:
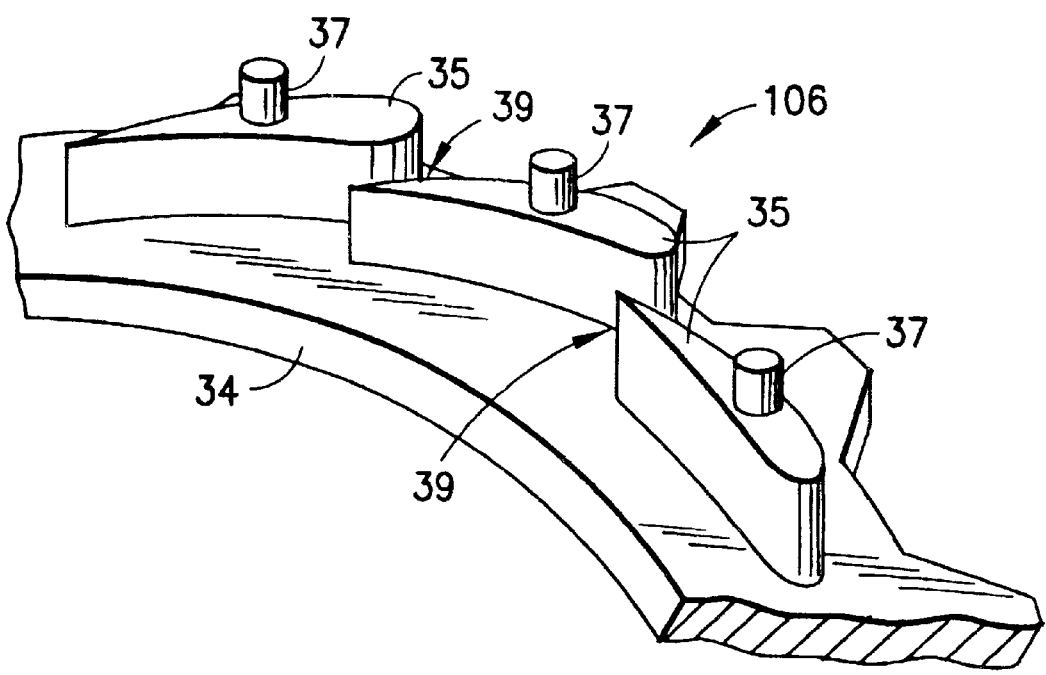
FIG. 6 is a partial perspective view showing a portion of an intermediate disk according to yet another embodiment of the present invention.

FIG. 6 shows a disk part 34 of yet another embodiment form of an intermediate disk 106 according to the invention. Only a partial area of the disk part 34 is shown in order to simplify the drawing. In this embodiment, spacers 35 are arranged on the disk part 34 with a rivet 37 protruding from each of the spacers 35. This embodiment form of the invention differs from that shown in FIG. 5 essentially in that the spacers 35 are vane-shaped. Another flat disk part like disk part 34 (the second disk part is not shown such that the shape of the vane spacers 35 may be appreciated) is fastened to the rivets 37 of the spacers 35. The spacers 35 and the disk parts 34 define lateral recesses 39. When the intermediate disk 106 is mounted in a clutch, not shown, the spacers 35 transport surrounding air radially inward or radially outward corresponding to the rotating direction of the intermediate disk 106 thereby facilitating cooling of the clutch. The spacers 35 are supported over a large surface area at the disk parts 34. Therefore, the intermediate disk 106 has increased stability.

The invention is not limited by the embodiments described above which are presented as examples only but can be modified in various ways within the scope of protection defined by the appended patent claims.

We claim:

1. An intermediate disk having first and second friction surfaces and connectable for rotation with a first shaft of a motor vehicle clutch between two friction facings of the motor vehicle clutch fastened for rotation with a second shaft so that the first and second friction surfaces are engageable for generating a frictional engagement with the friction facings, said intermediate disk comprising:

a first disk part comprising said first friction surface and a second disk part comprising said second friction surface; and a plurality of spacers arranged between said first and second disk parts such that recesses are formed between said first and second disk parts and between adjacent ones of said plural spacers, said first and second disk parts being connected via said plural spacers, and wherein said plural spacers comprise a plurality of separate distance pieces, each of said plural separate distance pieces comprising a discrete component arranged between said first and second disk parts.

2. The intermediate disk of claim 1, wherein said first and second disk parts contact each other exclusively via said plural spacers.

3. The intermediate disk of claim 1, wherein said distance pieces further comprise rivets operatively arranged for penetrating apertures in said first and second disk parts for connecting said first and second disk parts.

4. The intermediate disk of claim 1, wherein said plural spacers comprise air-conducting elements for guiding air present between said first and second disk parts through said recesses.

5. An intermediate disk having first and second friction surfaces and connectable for rotation with a first shaft of a motor vehicle clutch between two friction facings of the motor vehicle clutch fastened for rotation with a second shaft so that the first and second friction surfaces are engageable for generating a frictional engagement with the friction facings, said intermediate disk comprising:

a first disk part comprising said first friction surface and a second disk part comprising said second friction surface;

a plurality of spacers arranged between said first and second disk parts such that recesses are formed between said first and second disk parts and between adjacent ones of said plural spacers, said first and second disk parts being connected via said plural spacers; and clamps operatively arranged on said first and second disk parts for, pretensioning said first and second disk parts relative to one another.

6. An intermediate disk having first and second friction surfaces and connectable for rotation with a first shaft of a motor vehicle clutch between two friction facings of the motor vehicle clutch fastened for rotation with a second shaft so that the first and second friction surfaces are engageable for generating a frictional engagement with the friction facings, said intermediate disk comprising:

a first disk part comprising said first friction surface and a second disk part comprising said second friction surface;

a plurality of spacers arranged between said first and second disk parts such that recesses are formed between said first and second disk parts and between adjacent ones of said plural spacers, said first and second disk parts being connected via said plural spacers; and a corrugated ring comprising webs arranged between said first and second disk parts, wherein said plural spacers comprise said webs of said corrugated ring, wherein said corrugated ring further comprises clips operatively arranged for engaging recesses of the first and second disk parts.

7. The intermediate disk of claim 6, wherein said clips of said corrugated ring are flanged so that said clips engage behind said first and second disk parts for positively connecting said first and second disk parts.

* * * * *